United States Patent
Goulikar et al.

(10) Patent No.: US 10,558,746 B2
(45) Date of Patent: Feb. 11, 2020

(54) AUTOMATED COGNITIVE PROCESSING OF SOURCE AGNOSTIC DATA

(71) Applicant: Tata Consultancy Services Limited, Mumbai (IN)

(72) Inventors: Devraj Goulikar, Mumbai (IN); Aparna Joshi, Pune (IN); Saurabh Das, Powai (IN); Kamlesh Mhashilkar, Mumbai (IN); Rajdeep Sarkar, Pune (IN); Abhay Sodani, Pune (IN); Divya Vasudevan, Pune (IN); Vamsee Krishna Kodali, Mumbai (IN)

(73) Assignee: Tata Consultancy Services Limited, Mumbai (IN)

(*) Notice: Subject to any disclaimer, the term of this patent is extended or adjusted under 35 U.S.C. 154(b) by 64 days.

(21) Appl. No.: 15/935,591

(22) Filed: Mar. 26, 2018

(65) Prior Publication Data

US 2019/0102375 A1 Apr. 4, 2019

(30) Foreign Application Priority Data

Sep. 29, 2017 (IN) .............................. 201721034777

(51) Int. Cl.
*G06F 17/27* (2006.01)
*G06F 16/907* (2019.01)
(Continued)

(52) U.S. Cl.
CPC .......... *G06F 17/2725* (2013.01); *G06F 16/88* (2019.01); *G06F 16/907* (2019.01);
(Continued)

(58) Field of Classification Search
CPC ..................................................... G06F 16/88
See application file for complete search history.

(56) References Cited

U.S. PATENT DOCUMENTS

2003/0046317 A1* 3/2003 Cseri ............... G06F 17/218
715/234
2007/0083538 A1* 4/2007 Roy ................ G06F 17/2247
(Continued)

FOREIGN PATENT DOCUMENTS

EP 2 98 5711 A1 2/2016

OTHER PUBLICATIONS

YingChenPhD et al. "IBM Watson: How Cognitive Computing Can Be Applied to Big Data Challenges in Life Sciences Research" Clinical Therapeutics, Date: Apr. 2015, pp. 688-701 vol.—issue Nos. vol. 38, No. 4;Publisher: Elsevier Inc. Link: https://ac.els-cdn.com/S0149291815013168/1-s2.0-S0149291815013168-main.pdf?_tid=39413609-6f27-488d-be1b-ca3cda79e9ab&acdnat=1521612011_1d9801073844fb0de9abdd6332881a1c.
(Continued)

*Primary Examiner* — Asher D Kells
(74) *Attorney, Agent, or Firm* — Finnegan, Henderson, Farabow, Garrett & Dunner LLP

(57) ABSTRACT

With the scale of information available today along with the existing diverse channels of communication, manual processing of information is becoming a challenge and companies across industries are under tremendous pressure to lower transactional costs. Artificial Intelligence based automation of business transactions has seen regulatory hurdles due to probabilistic nature of the outcome. The main challenge lies in processing of transactions with unstructured information. Systems and methods of the present disclosure uses deterministic as well as probabilistic approaches to maximize accuracy. The larger use of deterministic approach with configurable components and ontologies helps to improvise accuracy, precision and reduce recall. The probabilistic approach is used when there is absence of quality information or less information for learning. Also, confi-
(Continued)

dence indicators are provided at attribute level of data being processed and at each decision level.

18 Claims, 16 Drawing Sheets

(51) Int. Cl.
    *G06F 16/84*     (2019.01)
    *G06F 17/24*     (2006.01)
    *G06N 3/02*     (2006.01)

(52) U.S. Cl.
    CPC ........ *G06F 17/248* (2013.01); *G06F 17/2735* (2013.01); *G06N 3/02* (2013.01)

(56) References Cited

U.S. PATENT DOCUMENTS

2009/0265339 A1* 10/2009 Chen .................. G06F 17/2247

2014/0195891 A1* 7/2014 Venkata Radha Krishna Rao ...... G06F 17/218 715/234
2016/0048655 A1* 2/2016 Maitra ................ G06F 19/3456 705/3

OTHER PUBLICATIONS

Mona Tanwar et al. "Unravelling unstructured data: A wealth of information in big data" Reliability, Infocom Technologies and Optimization (ICRITO) (Trends and Future Directions), 2015 4th International Conference on; Date: Sep. 2-4, 2015, Publisher: IEEE Link: https://www.researchgate.net/publication/304019247_Unravelling_unstructured_data_A_wealth_of_information_in_big_data.

Orobor, Ise et al. " Integration and Analysis of Unstructured Data for Decision Making: Text Analytics Approach" International Journal of Open Information Technologies, Date: Sep. 2016 pp. 82-88; vol.—issue Nos. vol. 4, No. 10 Publisher: International Journal of Open Information Technologies Link: 9.

* cited by examiner

SUSPECT ADVERSE REACTION REPORT

CIOMS FORM

| 1. PATIENT'S INITIALS (first, last) unknown | 1a. COUNTRY UNITED STATES | 2. DATE OF BIRTH Day 20 Month 9 Years 1990 | 2a. AGE Years 25 Year | 3. AGE F | 4-6 REACTION ONSET Day 2 Month 8 Year 2016 | 8-12 CHECK ALL APPROPRIATE TO ADVERSE REACTION<br>☐ PATIENT DIED<br>☑ INVOLVED OR PROLONGED INPATIENT HOSPITALIZATION<br>☐ INVOLVED PERSISTENCE OR SIGNIFICANT DISABILITY OR INCAPACITY<br>☐ LIFE THREATENING |

I. REACTION INFORMATION

7 + 13 DESCRIBE REACTION(S) (including relevant tests/lab data)

Events Verbatim [PREFFERED TERM]
Syncope[Syncope]
Breathlessness[Dyspnoea]
Cluster headaches[Middle ear adhesions]
Arthropod-borne haemorrhagic fever, unspecified[Rhinitis allergic]
Arthropod-borne haemorrhagic fever[Haemorrhagic fever]
Acute gonococcal infection of upper genitourinary tract[Rhinitis allergic]
Arthropod-borne haemorrhagic fever[Rhinitis allergic]

(Continued on additional information page)

Fields extraction

Reaction Date

Enrichment

List of Reactions — Fuzzy lookup

FIG.3B

'Age_Years':u'25',
'DOB':u'19900920',
'Month2':u'8',
'Day2':u'2',
'Routes_of_Admin':u'CUTANEOUS',
'Sex':u'F'
'Onset_date':u'20160802',

FIG.3C

'Reaction': {'Dyspnoea': (3,100,'Dyspnoea','10013968','Dyspnoea','10013968',brea ,'10033716','Y','Respiratory, thoracic and mediastinal disorders','10038711') 'Syncope': {1,100,'Syncope','10042772','Syncope','10042772','disturban NEC', '10029110','Y','Nervous system disorders','10029205'} 'Arthropod-borne haemorrhagic fever': ['unspecified': (6, 100 Arthropod-fever,'10061192, 'Viral infections NEC,'10047465,'Viral infectious disorders 'Arthropod-borne haemorrhagic fever['8', 100, 'Arthropod. borne haemorrhagic infections NEC 100.7465, Viral infectious disorders.''1000431C. Y, In Breathlessness.'': {2. 1CO,'Breathlessness','10006345',eSC.'Dyspnoea.'100113',NEC,10038716' ''Respiratory, thoracic and mediastinal disorders.'' '001,00 innocence' infection. of upper genitourinary tract'. 10, 100,Acute gonococcal infection of upper genitourinary tract,'10061181' Neisseria infection', infections and infestations, '10021811l,

FIG.3D

| SUSPECT ADVERSE REACTION REPORT | |
|---|---|
| | Continuation Page |
| Narrative | Case number US-ABC-2016-001583, is an initial Spontaneous report from a [Physician] [Citizen Hospital] received on 2016-08-10. This report refers to a 35-Year-old patient. The patient's medical history included . Concomitant medications included [Ibuprofen ]. The patient received [ASKIT] for the treatment of [Open fracture of shaft of tibia ] from [2016-08-01 00:00:00.0, 2016-08-01 00:00:00.0] at a dose of . On [2016-08-02 00:00:00.0, 2016-08-02 00:00:00.0] after starting the suspect drug the patient experienced [Syncope, Breathlessness ]. These events were considered serious by the [Physician]. Treatment with [ASKIT] medication was stopped due to these events on [2016-08-01 00:00:00.0, 2016-08-05 00:00:00.0]. The event outcome was [Not recovered/not resolved/ongoing, Recovered/Resolved] on [2016-08-06 00:00:00.0, 2016-08-06 00:00:00.0]. The [Physician] reported the [Syncope, Breathlessness] were [EVCTM, EVCTM, EVCTM, EVCTM] to treatment with [ASKIT]. |

FIG.3E

'PageText1':u'\n',u'PageText3':u" Mfr.Control Number: PageNarrativeCase number US-ABC-2016-001583, is an 10. This report refers to a 25-Year-old patient. The patient Patient received [ASKIT] for the treatement of [Open fractu Of. On [2016-08-02 00:00:00, 2016-08-02,00:00:00] after These events were considered serious by the [Physician]. 01 00:00:00.0, 2016-08-05 00:00:00.0]. The event outcome v 00:00:00.0, 2016-08-06 00:00:00.0]. The [Physician] reporte treatment with [ASKIT].\n",

FIG.3F

```
<pageid ="1" bbox="0.000,0.000,585.000,783.0"0">
<textbox id="0" bbox="47.000,719.902,135.434,748.786">
<textline bbox="47.000,741.496,122.954,748.786"">
<text font="NXFZZL+Univers-Condensed" bbox="47.000,741.496,50.666,748.666" size="7.170">H</text>
<text font="NXFZZL+Univers-Condensed" bbox="50.666,741.496,53.666,748.666" size="7.170">o</text>
<text font="NXFZZL+Univers-Condensed" bbox="53.666,741.496,56.330,748.666" size="7.170">s</text>
<text font="NXFZZL+Univers-Condensed" bbox="56.330,741.496,59.330,748.666" size="7.170">p</text>
<text font="NXFZZL+Univers-Condensed" bbox="59.330,741.496,60.662,748.666" size="7.170"> </text>
<text font="NXFZZL+Univers-Condensed" bbox="60.662,741.496,63.998,748.666" size="7.170">P</text>
<text font="NXFZZL+Univers-Condensed" bbox="63.998,741.496,66.998,748.666" size="7.170">h</text>
<text font="NXFZZL+Univers-Condensed" bbox="66.998,741.496,69.998,748.666" size="7.170">a</text>
<text font="NXFZZL+Univers-Condensed" bbox="69.998,742.496,71.996,748.666" size="7.170">r</text>
<text font="NXFZZL+Universs-Condensed" bbox="71.996,741.496,76.328,748.666" size="7.170">m</text>
<text font="NXFZZL+Univers-Condensed" bbox="76.328,741.502,77.660,748.786" size="7.284"> </text>
<text font="NXFZZL+Univers-Condensed" bbox="77.660,741.502,80.324,748.786" asze="7.284">2</text>
<text font="NXFZZL+Univers-Condensed" bbox="80.324,741.502,82.988,748.786" size="7.284">0</text>
<text font="NXFZZL+Univers-Condensed" bbox="82.988,741.502,85.652,748.786" size="7.284">1</text>
<text font="NXFZZL+Univers-Condensed" bbox="85.652,741.502,88.316,748.786" size="7.284">6</text>
<text font="NXFZZL+Univers-Condensed" bbox="88.316,741.502,89.648,748.786" size="7.284"> </text>
<text font="NXFZZL+Univers-Condensed" bbox="89.648,741.502,92.312,748.786" size="7.284">5</text>
<text font="NXFZZL+Univers-Condensed" bbox="92.312,741.502,94.976,748.786" size="7.284">1</text>
<text font="NXFZZL+Univers-Condensed" bbox="94.976,741.502,96.644,748.786" size="7.284">:</text>
<text font="NXFZZL+Univers-Condensed" bbox="96.644,741.502,99.308,748.786" size="7.284">1</text>
<text font="NXFZZL+Univers-Condensed" bbox="99.308,741.502,101.972,748.786" size-07.284"> </text>
<text font="NXFZZL+Univers-Condensed" bbox="101.972,741.502,103.640,748.786" wize="7.284">)</text>
<text font="NXFZZL+Univers-Condensed" nbox="103.640,741.502,104.972,748.786" smze="7.284">,</text>
```

FIG.4 pg 1 charcount Boxid1 31 doc_section NXFZZL+Univers-Condensed 7.284 ~x~ 45 125 ~y~ 741.496 748.786 ~vspcl~ -10.0 ~vspc2~ -10.0 84.98 745.14 txt Hosp Pharm 2016;51(11):884-887
pg 1 charcount Boxid2 36 doc_section NXFZZL+Univers-Condensed 7.284 ~x~ 45 135 ~y~ 734.302 741.586 ~vspcl~ -10.0 ~vspc2~ -10.0 91.22 737.94 txt 2016 Thomas Land Publishers, Inc.
pg 1 charcount Boxid3 26 doc_section NXFZZL+Univers-Condensed 7.284 ~x~ 45 120 ~y~ 727.102 734.386 ~vspcl~ -10.0 ~vspc2~ -10.0 82.27 730.74 txt www.hospital-pharmacy.com
pg 1 charcount Boxid4 25 doc_section NXFZZL+Univers-Condensed 7.284 ~x~ 45 105 ~y~ 719.902 727.186 ~vspcl~ -10.0 ~vspc2~ -10.0 75.48 723.54 txt doi: 10.1310/hpj5111-884
pg 1 charcount Boxid21 39 doc_section NXFZZL+Univers-CondensedBold 12.548 ~x~ 45 255 ~y~ 302.417 314.964 ~vspcl~ -10.0 ~vspc2~ -10.0 150.17 308.69 txt SILDENAFIL-INDUCED ERYTHEMA MOLT
pg 1 charcount Boxid23 53 doc_section NXFZZL+SabonLTStd-Roman 12.306 ~x~ 45 290 ~y~ 278.393 290.699 ~vspcl~ -10.0 ~vspc2~ -10.0 168.03 284.55 txt mild erythema for approximately 1 hours. The
pg 1 charcount Boxid24 54 doc_section NXFZZL+SabonLTStd-Roman 12.306 ~x~ 45 290 ~y~ 266.391 278.697 ~vspcl~ -10.0 ~vspc2~ -10.0 168.03 272.54 txt patient had no other abnormalities on physical exam.
pg 1 charcount Boxid25 57 doc_section NXFZZL+SabonLTStd-Roman 12.306 ~x~ 45 290 ~y~ 254.39 266.696 ~vspcl~ -10.0 ~vspc2~ -10.0 168.04 260.54 txt The patient's medical history incl HIV, which
pg 1 charcount Boxid26 54 doc_section NXFZZL+SabonLTStd-Roman 12.306 ~x~ 45 290 ~y~ 242.388 254.694 ~vspcl~ -10.0 ~vspc2~ -10.0 168.05 248.54 txt was diagnosed 4 years earlier. On diagnosis, his CD4
pg 1 charcount Boxid27 59 doc_section NXFZZL+SabonLTStd-Roman 12.306 ~x~ 45 290 ~y~ 230.387 242.702 ~vspcl~ -10.0 ~vspc2~ -10.0 168.04 236.54 txt count was very low at 53 cells/ (normal value,
pg 1 charcount Boxid28 57 doc_section NXFZZL+SabonLTStd-Roman 12.306 ~x~ , 45 285 ~y~ 218.394 230.702 ~vspcl~ -10.0 ~vspc2~ -10.0 166.59 224.55 txt 400-1400 cells/mm3), and he recei highly effec-
pg 1 charcount Boxid29 56 doc_section NXFZZL+SabonLTStd-Roman 12.306 ~x~ 45 285 ~y~ 206.394 218.7 ~vspcl~ -10.0 ~vspc2~ -10.0 166.57 212.55 txt tive antiretroviral therapy with tenofo nlmc

FIG.5 one subcutaneously and one periosteal, that totaled 18 mL of lidocaine. The patient's total lidocaine dose was 360 mg (5 mg/kg).

After the injections, the patient developed tingling in her right leg and right ear. She developed vspace 1
vspace 2 one subcutaneously and one periosteal, that totaled 18 mL of lidocaine. The patient's total lidocaine dose was 360 mg (5 mg/kg).

After the injections, the patient developed tingling in her right leg and right ear. She developed large vspace

FIG.6

Michael A. Mancano, PharmD*

The purpose of this feature is to heighten awareness of specific adverse drug reactions (ADRs), discuss methods of prevention, and promote reporting of ADRs to the US Food and Drug Administration's (FDA's) MEDWATCH program (800-FDA-1088). If you have reported an interesting, preventable ADR to MEDWATCH, please consider sharing the account with our readers. Write to Dr. Mancano at ISMP, 200 Lakeside Drive, Suite 200, Horsham, PA 19044 (phone: 215-707-4936; e-mail: mmancano@temple.edu). Your report will be published anonymously unless otherwise requested. This feature is provided by the Institute for Safe Medication Practices (ISMP) in cooperation with the FDA's MEDWATCH program and Temple University School of Pharmacy. ISMP is an FDA MEDWATCH partner.

FIG.7

Seriousness|10|01211.01
noun chunk|O||SMP Adverse Drug Reactions||SMP Adverse Drug Reactions
Patient Outcome|01|unknown|11.01|SMP Adverse Drug Reactions
sent clause|1|1"Intravenous Acetaminophen|induced|Acute Hepatotoxicity"|1|1|Intravenous Acetaminophen induced Acute Hepatotoxicity
noun chunk|1||Intravenous Acetaminophen|||Intravenous Acetaminophen induced Acute Hepatotoxicity
noun chunk||Acute Hepatotoxicity|||Intravenous Acetaminophen induced Acute Hepatotoxicity
Reaction|1|1|hepatotoxicity 11.0|Intravenous Acetaminophen induced Acute Hepatotoxicity
Drug : acetaminophen||lacetaminophen, tag:drug, route:intravenous, dose:-, start:-, end:-, dura:11.0|Intravenous Acetaminophen induced Acute Hepatotoxicity
Acute Hepatotoxicity
sent clause|2|"Acute Transient Myopia Induced|by|Zanamivir"||Acute Transient Myopia Induced by Zanamivir
sent clause|2|"Acute Transient Myopia Induced by Zanamivir|by|Zanamivir"||Acute Transient Myopia Induced by Zanamivir
noun chunk|2|Acute Transient Myopia Induced|||Acute Transient Myopia Induced by Zanamivir
noun chunk|2|Zanamivir|||Acute Transient Myopia Induced by Zanamivir
Unknown|2|myopia transient 11.0|Acute Transient Myopia Induced by Zanamivir
Drug : zanamivir|2|zanamivir, tag:drug, route:-, dose:-, start:-, end:-, dura:11.0|Acute Transient Myopia Induced by Zanamivir
sent clause|3|"Sildenafil|induced|Erythema Multiforme"|1|1|Sildenafil induced Erythema Multiforme
noun chunk|3|Sildenafil|1|1|Sildenafil induced Erythema Multiforme
noun chunk|3|Erythema Multiforme||Sildenafil induced Erythema Multiforme
Reaction|3|erythema multiforme 11.0|Sildenafil induced Erythema Multiforme
Drug : sildenafil|3|sildenafil, tag:drug, route:-, dose:-, start:-, end:-, dura:11.0|Sildenafil induced Erythema Multiforme
sent clause|4|1"Lidocaine|induced|Hoigne Syndrome"|1|1|Lidocaine induced Hoigne Syndrome
noun chunk|4|Lidocaine||1|Lidocaine induced Hoigne Syndrome
noun chunk|4|Hoigne Syndrome|1|1|Lidocaine induced Hoigne Syndrome
Dict Match NF|4|Hoigne Syndrome 10.0|Lidocaine induced Hoigne Syndrome
Drug : lidocaine|4|1|lidocaine, tag:drug, route:-, dose:-, start:-, end:-, dura:11.0|Lidocaine induced Hoigne Syndrome
noun chunk|5|Acute Liver Injury||Acute Liver Injury Due to Febuxostat
noun chunk|5|Febuxostat||Acute Liver Injury Due to Febuxostat

FIG.10

AUTOMATED COGNITIVE PROCESSING OF SOURCE AGNOSTIC DATA

PRIORITY CLAIM

This U.S. patent application claims priority under 35 U.S.C. § 119 to: Indian Patent Application No. 201721034777, filed on 29 Sep. 2017. The entire contents of the aforementioned application are incorporated herein by reference.

TECHNICAL FIELD

The disclosure herein generally relates to automated processing of source agnostic data, and particularly to systems and methods that mimic cognitive abilities of the human brain pertaining to reading, interpreting, evaluating and deciding to process data in an automated manner.

BACKGROUND

Companies across industries are under pressure to lower costs in an environment where channels of transactions with customer and service providers are getting diversified in the form of mobile applications, publications, electronic mails, portals, call centers, social media, peer and regulatory databases and Internet of things (IoT). Transactional systems in industries like Banking and Finance, Life science and Healthcare, Insurance, and the like are increasingly under focus of regulatory and government agencies. The companies are also under pressure to lower transactional costs. The varying nature of channels/sources, increasing volume of transactions, and stringent regulatory service level agreement (SLA have not only led to increased complexity of manual efforts but has also increased the challenge of processing of transactions with unstructured information. Some examples of complex transactions that require processing of unstructured information include a) In pharmacovigilance, increasing number of channels/sources viz., call centers, portals, mobile applications, social media, publications, emails/faxes, peer and regulatory databases as source for adverse reaction reporting and b) Communication surveillance for Anti money laundering (AML) requirements in financial services industry to reduce financial loss/fines. Also the scale of information available today makes it virtually impossible to manually process the information.

SUMMARY

Embodiments of the present disclosure present technological improvements as solutions to one or more of the above-mentioned technical problems recognized by the inventors in conventional systems.

In an aspect, there is provided a processor implemented method comprising: extracting metadata associated with one or more source documents, wherein the one or more source documents are identified as having a structured form, a semi-structured form, an unstructured form, an image form or a combination thereof, based on the extracted metadata; processing the one or more source documents for extracting data comprising entities and attributes thereof; extracting data from the one or more source documents in either native language or English language based on cognitive processing of the one or more source documents to obtain an Enterprise-to Business (E2B) Extensible Markup Language (XML) form having a pre-defined set of templates; evaluating the Enterprise-to Business (E2B) XML form for accuracy and completion of the step of extracting data; and deciding validity of the one or more source documents based on existence of content in the pre-defined set of templates.

In another aspect, there is provided a system comprising: one or more data storage devices operatively coupled to the one or more processors and configured to store instructions configured for execution by the one or more processors to: extract metadata associated with one or more source documents, wherein the one or more source documents are identified as having a structured form, a semi-structured form, an unstructured form, an image form or a combination thereof, based on the extracted metadata; process the one or more source documents for extracting data comprising entities and attributes thereof; extract data from the one or more source documents in either native language or English language based on cognitive processing of the one or more source documents to obtain an Enterprise-to Business (E2B) Extensible Markup Language (XML) form having a pre-defined set of templates; evaluate the Enterprise-to Business (E2B) XML form for accuracy and completion of the step of extracting data; and decide validity of the one or more source documents based on existence of content in the pre-defined set of templates.

In yet another aspect, there is provided a computer program product comprising a non-transitory computer readable medium having a computer readable program embodied therein, wherein the computer readable program, when executed on a computing device, causes the computing device to: extract metadata associated with one or more source documents, wherein the one or more source documents are identified as having a structured form, a semi-structured form, an unstructured form, an image form or a combination thereof, based on the extracted metadata; process the one or more source documents for extracting data comprising entities and attributes thereof; extract data from the one or more source documents in either native language or English language based on cognitive processing of the one or more source documents to obtain an Enterprise-to Business (E2B) Extensible Markup Language (XML) form having a pre-defined set of templates; evaluate the Enterprise-to Business (E2B) XML form for accuracy and completion of the step of extracting data; and decide validity of the one or more source documents based on existence of content in the pre-defined set of templates.

In an embodiment of the present disclosure, the one or more hardware processors are further configured to process the structured form and the unstructured form of the one or more source documents by: converting the one or more source documents to a formatted Extensible Markup Language (XML) form, wherein the formatted XML form includes in a raw form of one or more of (i) page wise information pertaining to coordinates, font style, font type of text contained therein at a character level and (ii) information pertaining to one or more of cells, border lines associated with the cells and images contained therein; and converting the formatted XML form to an intermediate XML form having a format conforming to a format of the corresponding one or more source documents.

In an embodiment of the present disclosure, the one or more hardware processors are further configured to extract data from the structured form of the one or more source documents by: identifying sections comprised in the intermediate XML form as parent nodes and extracting data contained in each of the sections based on a first set of pre-defined rules pertaining to the identified sections, wherein the sections include horizontal or vertical tables, forms, key-value pairs and plain text; storing the extracted data pertaining to each of the sections in an extracted XML form wherein entities and attributes thereof in each of the sections represents a child node having a value associated thereof; performing a context dictionary match for the entities and the attributes to obtain matched entities and attributes; and populating the Enterprise-to Business (E2B) XML form based on at least a part of the matched entities and attributes.

In an embodiment of the present disclosure, the one or more hardware processors are further configured to extract data from the unstructured form of the one or more source documents by: creating a master map of elements comprised in each page of the intermediate XML form, wherein the elements include page numbers and groups based on the attributes; determining a physical layout of each page based on the created master map; identifying the one or more source documents having the unstructured form based on a type associated thereof; creating an extracted XML form having a page by page flow based on the physical layout; segmenting the extracted XML into sentences and further extracting a set of sentence clauses from the sentences by: eliminating word joins and symbols in the sentences; annotating the sentences using a dependency parser; extracting the set of sentence clauses from the annotated sentences based on noun chunks, verb spans and dependencies between words in the sentences and a second set of pre-defined rules, wherein the dependencies are stored as a dependency tree in the form of a graph; parsing subject clauses and object clauses from the set of sentence clauses for the context dictionary match to obtain one or more entities; validating the obtained one or more entities based on either the context dictionary match or a probabilistic approach; extracting one or more validated entities along with attributes thereof as the extracted data; and populating the Enterprise-to Business (E2B) XML form based on at least a part of the extracted data.

In an embodiment of the present disclosure, the one or more hardware processors are further configured to perform the context dictionary match by performing at least one of: checking for an exact match by: comparing one or more words in the set of sentence clauses for the context dictionary match, wherein the context dictionary is pre-defined; identifying an exact match for a single word; checking for a partial match and processing a new match for multiple words; and checking for a fuzzy match by: performing a similarity match between the sentences; computing edit distance between two sentences and an associated similarity score; generating a fuzzy match output by either extracting values based on the computed similarity score, based on a pre-defined number of best matches, or based on a best match.

In an embodiment of the present disclosure, the one or more hardware processors are further configured to create a context dictionary by: receiving one or more training documents; annotating sentences contained in the one or more training documents and identifying entities therein; extracting sentence clauses from the annotated sentences and identifying sentence clauses having the identified entities; analyzing context association of the identified entities with verb spans in the sentence clauses; computing frequency of the context association based on a context mining method; and selecting the context association to be included in the context dictionary based on the computed frequency thereof.

In an embodiment of the present disclosure, the one or more hardware processors are further configured to evaluate the Enterprise-to Business (E2B) XML form by: correlating the set of templates obtained from the Enterprise-to Business (E2B) XML form to check similarity across the one or more source documents; and computing a confidence score of extraction of entities and attributes in each of the Enterprise-to Business (E2B) XML form; and computing an overall confidence score for each of the Enterprise-to Business (E2B) XML form.

In an embodiment of the present disclosure, the one or more hardware processors are further configured to compute a confidence score of extraction of entities and attributes based on one or more of: the form of the one or more source document; the method of validating the one or more entities based on a context dictionary match or a probabilistic approach; and accuracy of the context dictionary match.

In an embodiment of the present disclosure, the one or more hardware processors are further configured to compute the overall confidence score based on the confidence score of each of the extraction of entities and attributes and pre-defined weightages thereof.

In an embodiment of the present disclosure, the one or more hardware processors are further configured to classify the validated one or more source documents based on analyses of the content in the pre-defined set of templates using neural networks.

In an embodiment of the present disclosure, the one or more hardware processors are further configured to trace decisions pertaining to at least the steps of: validating the one or more entities based on a context dictionary match or a probabilistic approach; correlating the set of templates obtained from the Enterprise-to Business (E2B) XML form; deciding on validity of the one or more source documents; and classifying the validated one or more source documents, by contextual logging of the steps, capturing input and output of each of the steps and linking transformation of information at each of the steps.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A is an exemplary illustration of extracting data from a source document having a combination of data in structured form and unstructured form using either a deterministic approach or a probabilistic approach, in accordance with an embodiment of the present disclosure.

FIG. 3B, FIG. 3C, FIG. 3D, FIG. 3E, and FIG. 3F all illustrate zoomed portions of FIG. 3A.

FIG. 4 illustrates text lines identified in an exemplary intermediate XML with a text box assigned to the text lines, in accordance with an embodiment of the present disclosure.

FIG. 5 illustrates an exemplary master map of elements in accordance with an embodiment of the present disclosure.

FIG. 6 illustrates vertical spaces within each text box in accordance with an embodiment of the present disclosure.

FIG. 7 illustrates grouping the text boxes to form a block in accordance with an embodiment of the present disclosure.

FIG. 10 is an exemplary illustration of decision traceability in accordance with an embodiment of the present disclosure.

Figure 1A:
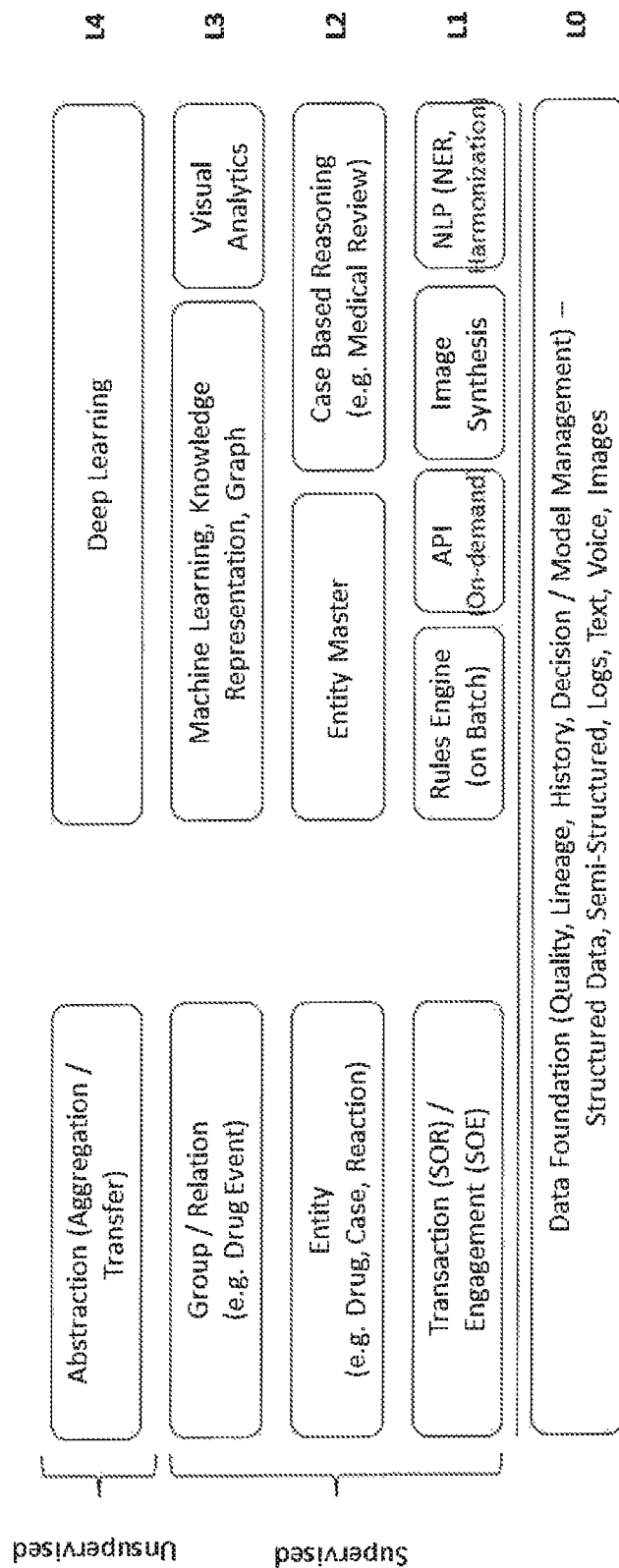
FIG. 1A illustrates a high level architecture of a system, particularly an exemplary pharmacovigilance system for automated cognitive processing of source agnostic data, in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure is directed to processing data, particularly data pertaining to transactional systems, agnostic of the source of the data. In the context of the present disclosure, the expression "data" refers to transactional data that may be received from diverse channels/sources viz. call centers, portals, mobile applications, social media, publications, emails/faxes, peer and regulatory databases and may interchangeably referred to as "transactional data". Transactional data, typically having at least a portion in unstructured form increases complexity of automated processing. While AI based solutions have been attempted in the art, they have seen regulatory hurdles due to probabilistic nature of the outcome. Systems and methods of the present disclosure provide an integrated cognitive solution for transactional systems and use deterministic as well as probabilistic approaches to maximize accuracy of processing transactional data. The larger use of deterministic approach with configurable components and ontologies helps to improvise accuracy, precision and reduce recall. The probabilistic approach is used when there is absence of quality information or less information for learning. Again, confidence indicators are provided at attribute level of the data as well as each decision level. The systems and methods of the present disclosure mimic how human mind decides based on certain factors such as observing, learning, building a hypothesis, evaluating the hypothesis and deciding based on the evaluation.

Referring now to the drawings, and more particularly to FIGS. 1 through 10, where similar reference characters denote corresponding features consistently throughout the figures, there are shown preferred embodiments and these embodiments are described in the context of the following exemplary system and method.

Figure 1B:
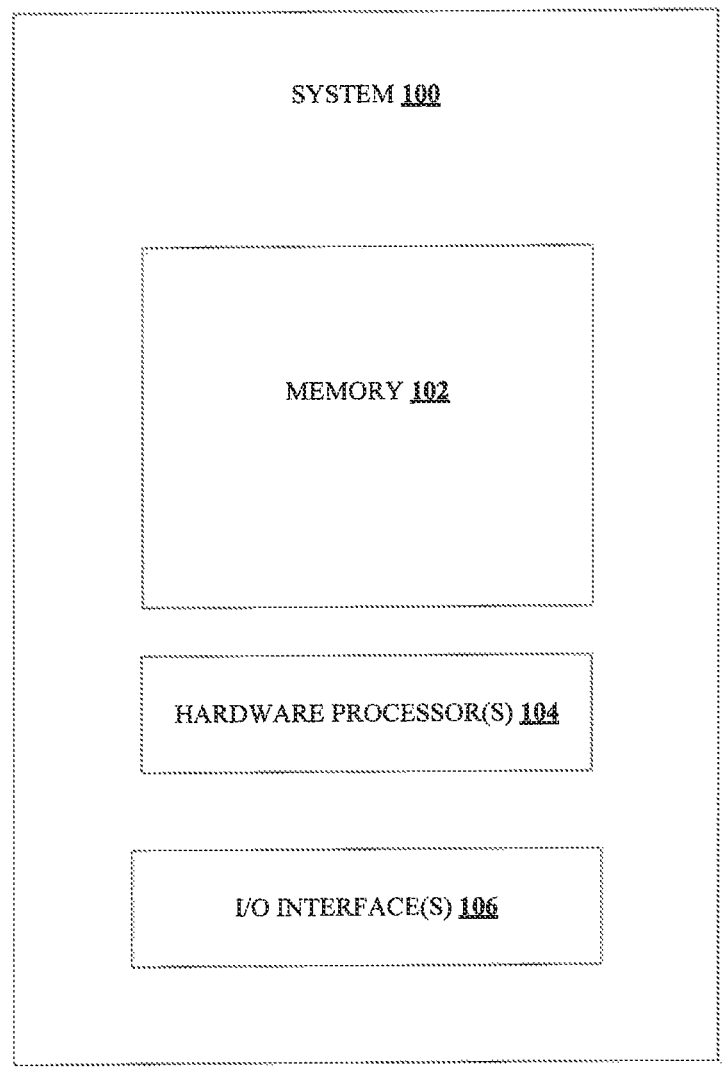
FIG. 1B illustrates an exemplary block diagram of the system for automated cognitive processing of source agnostic data, in accordance with an embodiment of the present disclosure.

FIG. 1A illustrates a high level architecture of a system, particularly an exemplary pharmacovigilance system for automated cognitive processing of source agnostic data, in accordance with an embodiment of the present disclosure. The systems and methods of the present disclosure are based on the concept of mimicking human behavior to learn and interpret data using deterministic as well as probabilistic approaches to maximize accuracy and take decisions based on the evaluated or analyzed data. Exemplary building blocks of the system of the present disclosure are shown in FIG. 1A and may contain components from different branches of Artificial Intelligence such as Perception, Natural Language Processing, Machine Learning (+Deep Learning), Reasoning and Knowledge Representation. Most of the components in the building blocks are plug and play components and hence third party components may also be integrated based on need and convenience. The high level architecture is generally implemented at five levels (L0 through L4) wherein L0 is a data ingestion layer, L1 represents an observing and learning layer, L2 represents an understanding and interpreting layer, L3 represents an evaluation layer and L4 represents a decision layer. Although it is not expected to be sequential in nature i.e. from L0 to L4, systems of the present disclosure make use of deterministic components in the beginning to set higher accuracy standards and improvise over period. At different levels (L1-L4) different abstractions or derivations of the data may be used. For instance, in the context of Life science, transactions, documents and ontologies are used at the L1 level, patient or case masters are used at the L2 level, evaluation of the information at the L3 level and deciding causality and further analyses at the L4 level. FIG. 1B illustrates an exemplary block diagram of a system 100 for automated cognitive processing of source agnostic data, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 comprises one or more data storage devices or memory 102 operatively coupled to the one or more processors 104 and is configured to store instructions configured for execution of steps of the method 200 by the one or more processors 104.

Figure 2:
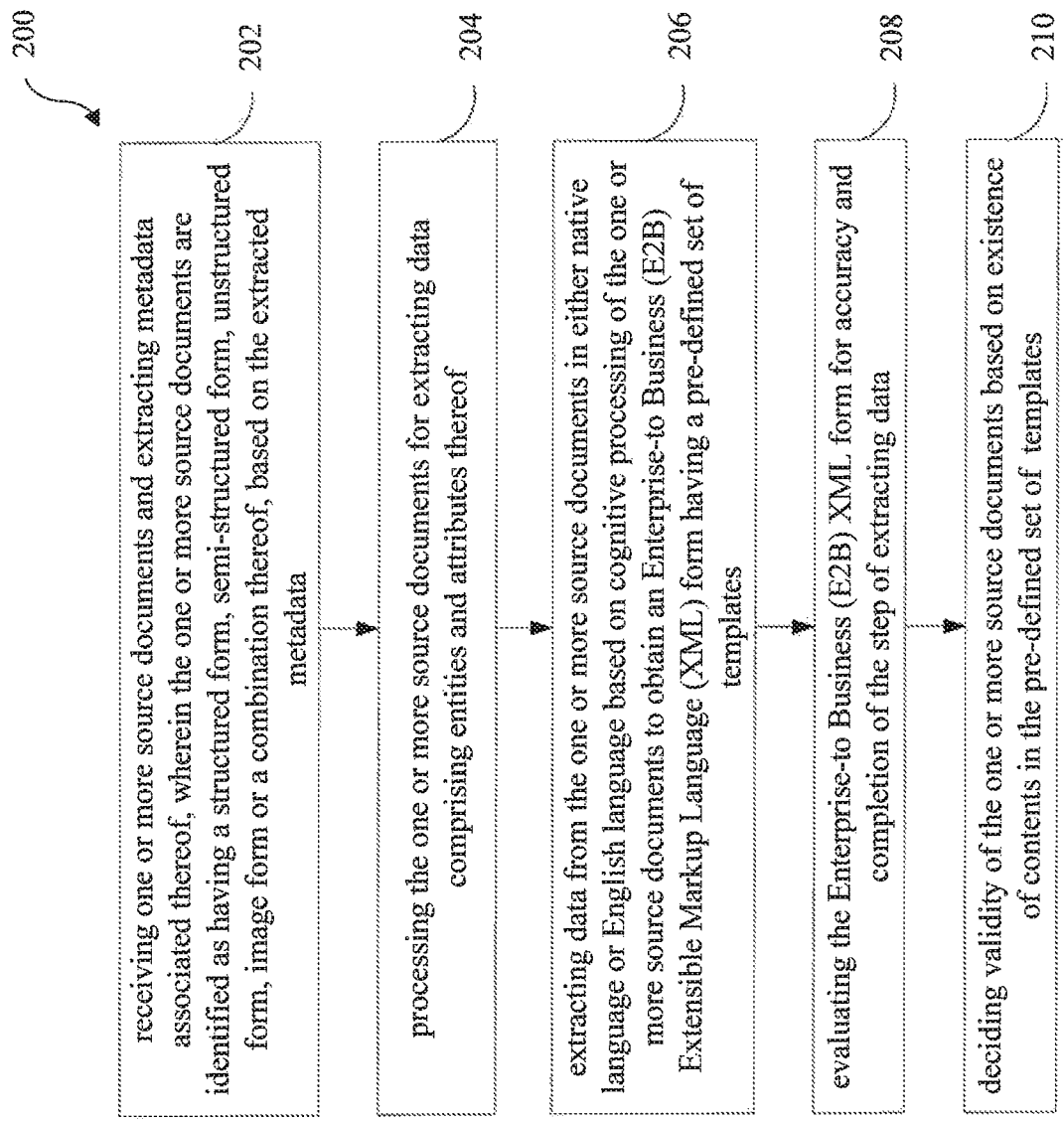
FIG. 2 is an exemplary flow diagram illustrating a computer implemented method for automated cognitive processing of source agnostic data, in accordance with an embodiment of the present disclosure.

FIG. 2 is an exemplary flow diagram illustrating a computer implemented method for automated cognitive processing of source agnostic data, in accordance with an embodiment of the present disclosure. The steps of the method 200 will now be explained in detail with reference to the high level architecture depicted in FIG. 1A and the exemplary components of the system 100 as depicted in FIG. 1B. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The systems and methods of the present disclosure can be applied to transactional systems pertaining to industries including Banking and Finance, Life science and Healthcare, Insurance, and the like. For ease of explanation, the description hereinafter refers particularly to a non-limiting example of life science industry, particularly to automation of various pharmacovigilance activities including:

a. Intake (automated data ingestion like emails, faxes, standardized forms like Council for International Organizations of Medical Sciences (CIOMS) or sponsor specific, Optical Character Recognition (OCR) for scanned Portable Document Format (PDF), comma-separated values (CSV) like listings, eXtensible Markup Language (XML) (refer implementation at L0 level)

b. Triage (prioritization, information extraction—entities and attributes, validity of cases, work scheduling) (refer implementation at L2 and L3 levels)

c. Decision Making Actions like medical coding, causality assessment, quality control, Advance Duplicate search, Seriousness Classification, Prioritization Classification, Validity of AE case, Auto case Listedness, Case Based Reasoning (refer implementation at L3 and L4 levels)

d. Submission Management (routing cases as per business rules to regulatory agencies and corresponding SLA management)

e. Continuous Safety Analysis (real time generation of safety signals for further analysis)

The systems and methods of the present disclosure may be provided as a distributed cloud based solution that can be used in a pharmacovigilance market place or as plug-n-play component to existing safety systems.

The systems and methods of the present disclosure can also be applied to automation of communication surveillance activities including:

a) Intake (automated data ingestion like emails, emails with attachments, chat, and external data like Bloomberg™, Reuters™, and Skype™) (refer implementation at L0 level).

b) Data Transformation includes data flattening, transformation and loading to Target model, ingestion to content repository, ingestion to NLP Engine (refer implementation at L1 and L2 levels).

c) Policy and Rule Management UI based workflow to define, approve and manage the rules and policies under every category (refer implementation at L1 and L2 levels).

d) Decision Making Actions like identifying anomalies and misconduct in one to one trader communication and multi-bank trader communication based on policies and rules under Market Abuse, Rumour circulation, (refer implementation at L3 and L4 levels).

e) Visualization Dashboards and KPI reports per region (refer implementation at L3 level).

The systems and methods of the present disclosure may be distributed as an in premise solution that may be used as an independent component for communication surveillance or as a plug-n-play component to existing Risk Analysis systems like Actimize™.

In accordance with an embodiment of the present disclosure, the one or more processors 104 are configured to extract metadata, at step 202, associated with one or more source documents. In an embodiment this step maybe implemented as part of the L0 level or the data ingestion layer. The one or more source documents may be identified as having a structured form, a semi-structured form, an unstructured form, an image form or a combination thereof, based on the extracted metadata. The data may be identified as having a structured form when the data includes relational keys that can be easily mapped into pre-designed fields and the data can be stored in database SQL in table with rows and columns. Semi-structured data is information that doesn't reside in a relational database but that does have some organizational properties that make it easier to analyze, for instance, Extensible Markup Language (XML). Unstructured data represent around 80% of data. It generally includes free flowing text, for instance, electronic mails, word processing documents, presentations, webpages and many other kinds of business documents. While these files may have an internal structure, they are still considered «unstructured» because the data they contain does not fit neatly in a database.

In accordance with an embodiment of the present disclosure, the one or more processors 104 are configured to process, at step 204, the one or more source documents for extracting data comprising entities and associated attributes. In an embodiment this step maybe implemented as part of the L1 level or the observing and learning layer. The step of processing converts the one or more source documents to formats that ease further processing. In an embodiment, the processing step firstly involves converting the one or more source documents to a formatted Extensible Markup Language (XML) form, wherein the formatted XML form includes in a raw form of one or more of (i) page wise information pertaining to coordinates, font style, font type of text contained therein at a character level and (ii) information pertaining to one or more of cells, border lines associated with the cells and images contained therein. In an exemplary embodiment, when converting a pdf file to XML file, PDFMiner, a Python™ package may be used.

Sample Output of PDFMiner xml

```xml
<pages>

<textbox id="0" bbox="189.250,741.412,363.220,765.406">
            <textline bbox="189.250,741.412,363.220,765.406">
                <text font="AAAAAA+TimesNewRoman,Bold"
                bbox="189.250,741.412,202.246,765.406" size="23.994">A</text>
                <text font="AAAAAA+TimesNewRoman,Bold"
                bbox="201.994,741.412,214.000,765.406" size="23.994">E</text>
                <text font="AAAAAA+TimesNewRoman,Bold"
                bbox="214.000,741.412,218.500,765.406" size="23.994"></text>
            <textbox/
            <rect linewidth="0" bbox="12.250,697.300,599.050,718.550"/>
            <line linewidth="0" bbox="12.250,718.050,599.000,718.050"/>

</pages>
```

Sample Output of Formatted xml

```xml
<line>
<text bold="True" font="TimesNewRoman,Bold" id="1" size="18.995"
x1="277.0" x2="335.653" y1="95.067" y2="76.072">Patient(s)</text>
</line>
<line>
<textbox id="1" x1="15.15" x2="144.0" y1="697.3" y2="683.0">
<text bold="True" font="TimesNewRoman,Bold" id="1" size="14.996"
x1="39.8" x2="120.879" y1="699.366" y2="684.37">Patient
Involved</text>
</textbox>
<textbox id="2" x1="144.0" x2="599.0" y1="697.783" y2="683.0">
<text bold="False" font="ArialUnicodeMS" id="1" size="12.672"
x1="151.45" x2="179.764" y1="697.783" y2="685.111">Known</text>
</textbox>
</line>
<line>
<textbox id="3" x1="294.0" x2="414.0" y1="683.0" y2="663.0">
<text bold="True" font="TimesNewRoman,Bold" id="1" size="14.996"
x1="300.25" x2="392.41" y1="679.866" y2="664.87">First Name /
Initial</text>
</textbox>
<textbox id="4" x1="414.0" x2="588.2" y1="683.0" y2="663.0">
<text bold="False" font="ArialUnicodeMS" id="1" size="12.672"
x1="420.25" x2="443.758" y1="677.655" y2="664.983">Daisy</text>
</textbox>
</line>
<line>
<textbox id="1" x1="12.25" x2="144.0" y1="663.0" y2="644.0">
<text bold="True" font="TimesNewRoman,Bold" id="1" size="14.996"
x1="36.25" x2="140.413" y1="660.366" y2="645.37">Middle Name /
Initial</text>
</textbox>
```

The formatted XML form is then converted to an intermediate XML form having a format conforming to a format of the corresponding one or more source documents.

In accordance with an embodiment of the present disclosure, the one or more processors 104 are configured to extract data, at step 206, from the one or more source documents in either native language or English language based on cognitive processing of the one or more source documents to obtain an Enterprise-to Business (E2B) Extensible Markup Language (XML) form having a pre-defined set of templates. For instance, in the exemplary Life science scenario, the pre-defined set of templates may include Case, Patient, Reporter, Drug and Adverse Event. In an embodiment, the step 206, of extracting data may be implemented as part of the L1 level or the observing and learning layer. At this layer, transactional or interaction specific information is processed and knowledge is acquired. In accordance with the present disclosure, a Neuro-linguistic programming (NLP) engine extracts the data in the native language or in English language. Application Programming Interfaces (API) may be used for language translation (e.g. Microsoft™ Translator), social data extraction (e.g. Twitter™) or even third party Optical character recognition (OCR)/Optical mark recognition (OMR)/Intelligent Character Recognition (ICR) (e.g. NewOCR API, Abbyy Cloud API, Microsoft Azure™ OCR). Enriching the entities using a context dictionary (explained herein after) may be implemented as part of the L2 level or the understanding and interpreting layer. Various ontologies such as MedDRA™, World Health Organization Drug Dictionary (WHODD), Human Names, Special Terms, English Dictionary may be used and can be augmented with company specific lexicons e.g. Listed Events. Also these may be replaced/augmented with non-English ontologies as well.

The deterministic approach is used in information extraction from PDF/docx tables, fields or XML/JSON followed by rule based information enrichment. The rules are either configured during priming stage or learnt by the system 100 from L2-L4 levels. The probabilistic approach is used in information extraction from images, translation and fuzzy lookups on ontologies.

Figures 3A, 3B, 3C, 3D, 3E, 3F:
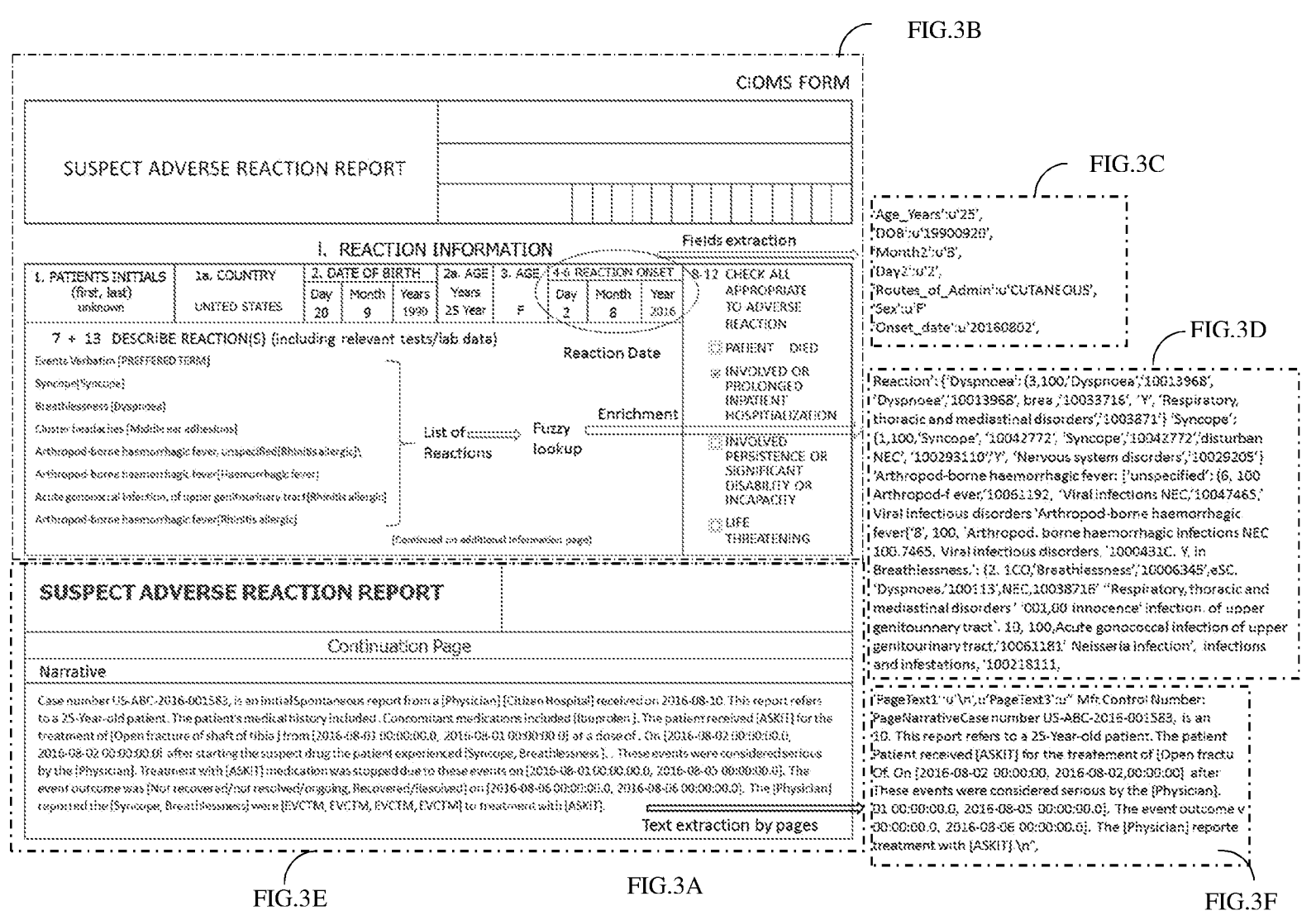

FIG. 3A is an exemplary illustration of extracting data from a source document having a combination of data in structured form and unstructured form using either a deterministic approach or a probabilistic approach. FIG. 3B through FIG. 3F illustrate zoomed portions of FIG. 3A. In an embodiment, the step of extracting data from the structured form of the one or more source documents firstly comprises identifying sections comprised in the intermediate XML form as parent nodes and extracting data contained in each of the sections based on a first set of pre-defined rules pertaining to the identified sections. Data in the structured form may be present in the sections as horizontal or vertical tables, forms, key-value pairs and plain text. The extracted data from each of the identified sections is stored in an extracted XML form wherein entities and their associated attributes in each of the sections represents a child node having an associated value. For example, under an identified section 'Patient information', if Patient name: Daisy Duck, then 'Patient Name' is the attribute and 'Daisy Duck' is the associated value.

Sample Output of Extracted xml:

```xml
<table id="Patient(s)">
    <Patient_Involved>Known</Patient_Involved>
    <First_Name_Initial>Daisy</First_Name_Initial>
    <Middle_Name_Initial>(No data entry)</Middle_Name_Initial>
    <Last_Name_Initial>Duck</Last_Name_Initial>
    <Suffix>(No data entry)</Suffix>
    <Date_of_Birth>(No data entry)</Date_of_Birth>
    <Age>45</Age>
    <Age_Unit>Years</Age_Unit>
    <Gender>Female</Gender>
</table>
```

An exemplary first set of pre-defined rules may be as represented herein below.

```
# check for vertical table column headers
            if 'False' not in text_box_bold_list and None not in columns_text_list and len(columns_text_list) > 1:
                vertical_column_headers = [common_utils.replace_sp_chars_from_node(x) for x in columns_text_list]
            # check for vertical table columns text
            elif 'True' not in text_box_bold_list and len(columns_text_list) > 0 and len(columns_text_list) == len(vertical_column_headers):
                # create new tr node
                row_node = ETree.Element('tr')
                for index, current_vr_header in enumerate(vertical_column_headers):
                    column_text = columns_text_list[index]
                    # if current column header is not empty then
                    # create an element with header name and add text under it
                    if current_vr_header != '':
                        cell_node = ETree.Element(current_vr_header)
                        cell_node.text = column_text
                        row_node.append(cell_node)
                    current_table_element.append(row_node)
                # check of row of horizontal table
            elif 'True' in text_box_bold_list and 'False' in text_box_bold_list:
                header = ''
                vertical_column_headers = [ ]
```

In an embodiment, the system may be configured to receive additional information from an external source to improve identification of the attributes and the associated values. For instance, in the exemplary Life science scenario, if a patient name is not extracted, such information may be retrieved from an external source.

In accordance with an embodiment of the present disclosure, after generating the extracted XML form, a context dictionary match is performed for the entities and the attributes to obtain matched entities and attributes; and an Enterprise-to Business (E2B) XML form is populated based on at least a part of the extracted data. In an embodiment, the context dictionary match comprises at least one of checking for an exact match or checking for a fuzzy match. An exact match check comprises comparing one or more words in the set of sentence clauses for the context dictionary match, wherein the context dictionary is pre-created as explained later in the description. An exact match is identified for a single word. If the entity is a multi-word, and if a partial match already exists, it uses the new match for further processing. For a fuzzy match, in accordance with the present disclosure, firstly a similarity match is performed between the sentences. In an embodiment, the sentences maybe standardized by converting strings to string object, if needed, replacing non alphanumeric characters with white spaces, converting all characters to lower case, applying stemming on each word, applying lemmatization on each word and removing heading and trailing white spaces. Once standardized, similarity match may be performed by using sorting or sets. In an embodiment, Levenshtein distance algorithm may be applied to calculate edit distances between two sentences and based on the edit distances a similarity score may be computed. In an embodiment, Python™ implementation of edit distance package provided under MIT™ license may be used for the computation as represented herein below.

total_length=length of string_1+length of string_2 edit_distance=edit_distance (string_1,string_2)

if edit_distance>0:

similarity_score=100*(total_length−edit_distance)/total_length similarity score is in the range of 0-100, where 0 is lowest and 100 is highest similarity score.

In an embodiment, the step of extracting data from the unstructured form of the one or more source documents firstly comprises creating a master map of elements comprised in each page of the intermediate XML form, wherein the elements include page numbers and groups based on the attributes. An exemplary master map may be created for following elements having page by page text box list for lines:

Page #
Group id
Box id
Charcount
doc_sections (will not have value at the start)
Font
Font size
Cell_x1, Cell_x2
Cell_Y1, Cell_y2
Vspace 1 (vert space with line above)
Vspace 2 (vert space with line below)
Cell x center
Cell y center FIG. 4 illustrates text lines identified in an exemplary intermediate XML with a text box assigned to the text lines and FIG. 5 illustrates an exemplary master map of elements in accordance with an embodiment of the present disclosure.

The physical layout of each page is then determined based on the created master map. In an embodiment, the physical layout may be based on the syntactical structure of the elements which includes building the layout from the characters to words, lines and blocks based on the position, font, font sizes and gaps (vertical and horizontal spaces). FIG. 6 illustrates vertical spaces within each text box in accordance with an embodiment of the present disclosure. The text boxes are ordered by page numbers and position coordinates (x1—position from the left edge of the page, y2—position from the top edge of the page), font type and font size. The vertical spaces (vspace1, vspace2) are identified and updated in the master map. This identifies continuation of text and section break. In an embodiment, false section breaks may be identified by checking for large vertical spaces (large vspace); checking if line just before has the same font and updating the master map accordingly. FIG. 7 illustrates grouping the text boxes to form a block in accordance with an embodiment of the present disclosure. The text boxes are ordered by page numbers, font, font size, x1 (position from the left edge of the page), y2 (position from the top edge of the page); grouped if x1, font, font size are same and vertical space vspace is less than a pre-defined value; and a group ID is created.

The one or more source documents having the unstructured form are then identified based on the associated type. For instance, existence of electronic mail metadata labels, font uniformity, presence of date and identified e-mail body may identify the one or more source documents as an e-mail. If there is font uniformity throughout, the one or more source documents may be identified as a business letter. Likewise, the one or more source documents may be identified as literature based on rules for header/footer, headings, author, and the like. In case of a literature source document, logical layout rules, in an embodiment may be as given below—

Segment the page 1 in—
  Report Body
    Start from Y1 (position from the bottom edge of the page) look for consistent columnar structure going upwards Y1
    Max(Y1) where you get two columns, that marks is the probable start of the start of the Report body. To confirm the start—
      Check for section header in the min(x1) group
      Check for vspace with a group above (next Y1) is >3
      There is a line demarking the sections
  Report Information
    The rest of the page represents Report information (This is the first part of page 1

Figure 8:
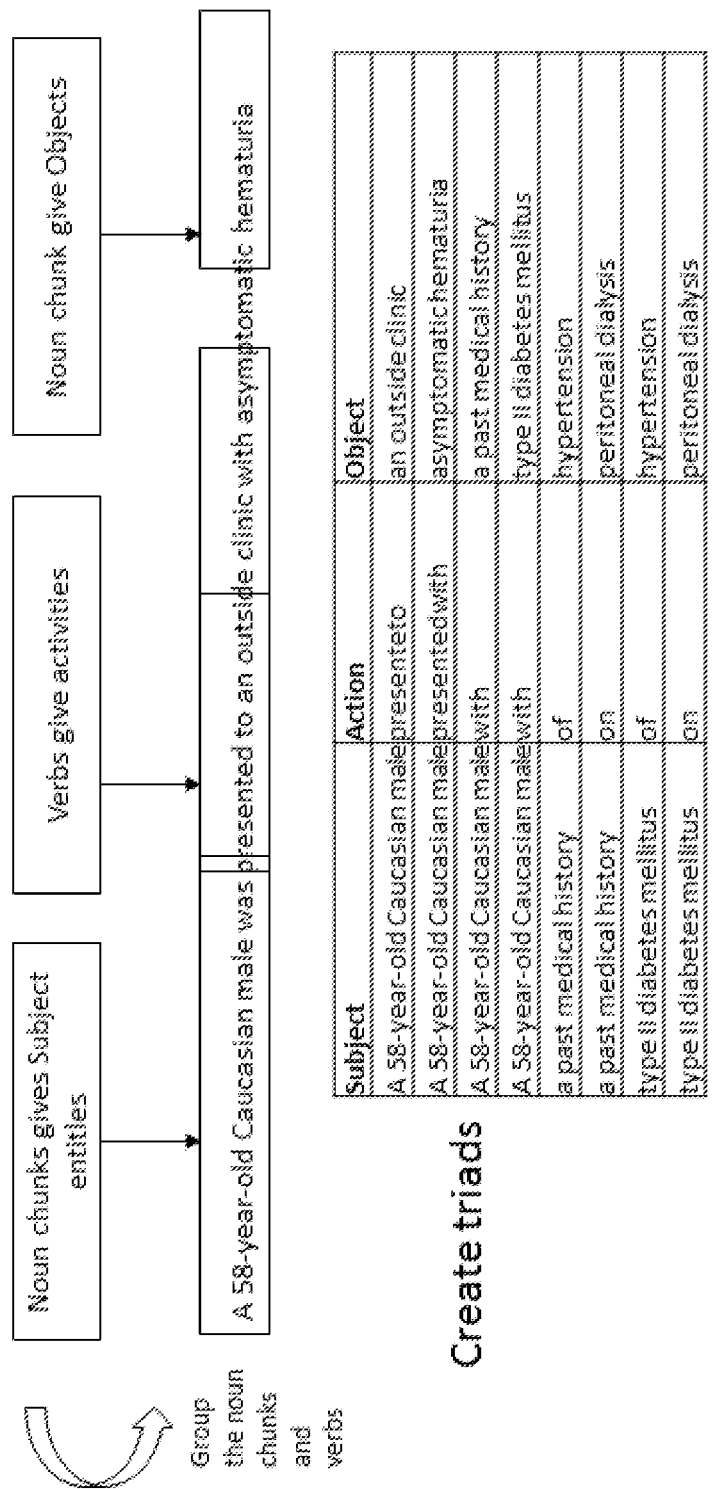
FIG. 8 is an exemplary illustration of extracting sentence clauses from sentences in accordance with an embodiment of the present disclosure.
Figure 9:
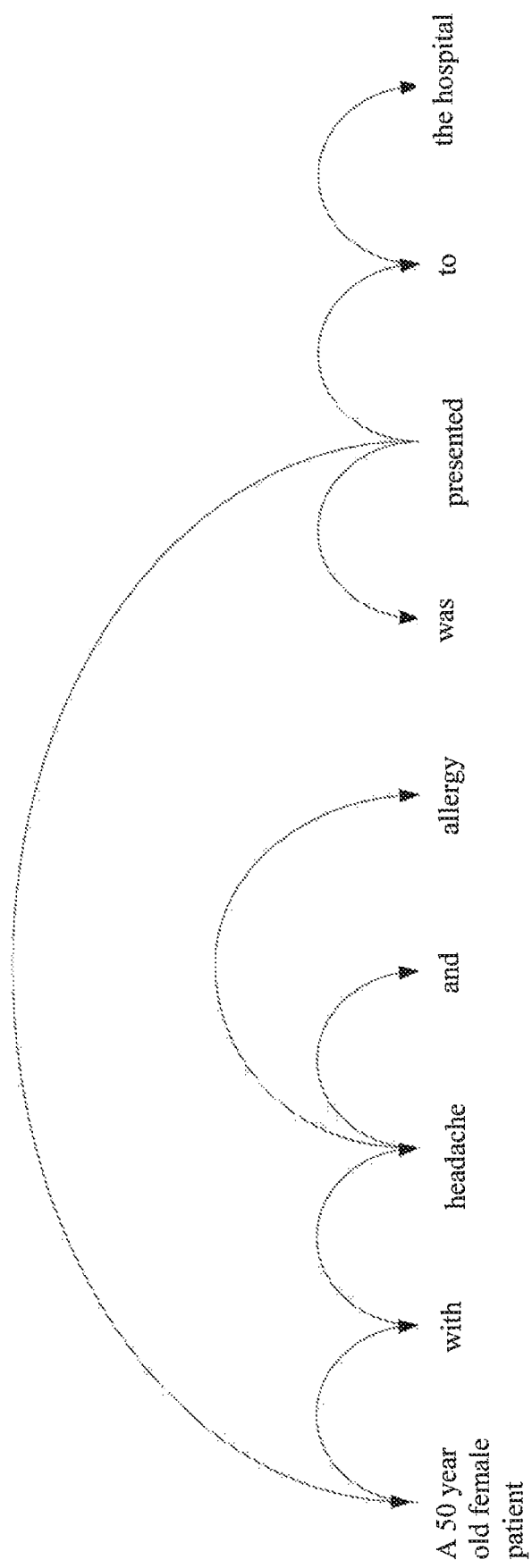
FIG. 9 is an exemplary illustration of a dependency tree in accordance with an embodiment of the present disclosure.

An extracted XML form having a page by page flow is then created based on the physical layout. In accordance with an embodiment of the present disclosure, the extracted XML is first segmented into sentences using say a Natural Language ToolKit's (NLTK) sentence tokenizer and processed each sentence at a time; Parts of Speech (POS) tagging is then performed to further extract a set of sentence clauses including subject clause, object clause and verb clause are extracted from the sentences as illustrated in FIG. 8. In an embodiment, extracting sentence and sentence clauses firstly involves eliminating word joins and symbols in the sentences. The sentences are then annotated using a dependency parser such as SpaCy™ parser. The set of sentence clauses are then extracted from the annotated sentences based on noun chunks, verb spans (verb together with preposition e.g. admitted to, admitted with) and dependencies between words in the sentences and a second set of pre-defined rules. In an embodiment, the dependencies are stored as a dependency tree in the form of a graph as illustrated in FIG. 9.

In an embodiment of the present disclosure the second set of pre-defined rules that particularly enable creating noun chunks may comprise:
  Do not allow other nouns in between connecting nouns, as long as they are not conjunctional.
    e.g. The Wrights used AI that discovered airplanes.
    Here, Wrights, AI and airplanes are nouns. AI is a noun between Wrights and airplanes. In accordance with the present disclosure, AI may not be allowed between Wrights and Airplane.

The output clauses are:
    'AI'→'discovered'→'airplanes'
    'The Wrights'→'used'→'AI'
  Do not allow more than 1 preposition between 2 nouns
    If these conditions are not met, a connection is considered as 'bad' in which case the resulting clause is discarded.
    eg. Aspirin was given to treat pain in the fingertips of right arm.
    Between pain and right arm, there are 2 prepositions in the dependency tree—in and of. In accordance with the present disclosure, any clause connecting pain and right arm is not allowed.
  Ensure verbs are not part of noun chunks.
    eg. 'Lev-induced pain' is a noun chunk represented by a dependency parser such as SpaCy™, whereas in accordance with the present disclosure, the extracted noun chunks may be 'Lev' and 'pain'
  Include dates as noun chunks this provides an easy co-relation of the date with the entities
  Include 'Domain Specific Chunks'. For example 1 ng/mg/min is a pharma measure of dosage. For Spacy and others, this is not a noun chunk. However, such spans need to be identified and are put them as noun chunks, especially because they help in detecting proper contexts for entity extractions.
  Allow for verbial and adverbial clauses, i.e. allow for clauses if a noun-chunk does not connect with any other noun-chunk using that verb or adverb.
    e.g. 'Patient died.' will be extracted as a clause (without an object) as shown below.
    Patient→died→'

The subject clauses and object clauses from the set of sentence clauses are parsed for the context dictionary match to obtain one or more entities. The obtained one or more entities are then validated based on either the context dictionary match or a probabilistic approach. One or more validated entities along with their attributes are then extracted and the Enterprise-to Business (E2B) XML form is populated based on at least a part of the extracted data. For an exemplary sentence: A 50-year-old female patient with headache and allergy was presented to the hospital., the sentence clauses defined may be:
1. A 50-year-old female patient ! presented to ! the hospital
2. A 50-year-old female patient ! presented with ! headache
3. A 50-year-old female patient ! presented with ! allergy In an embodiment of the present disclosure, as part of the sentence clause extraction, the one or more processors 104 are configured to perform sentence level functions that mimic human reading. For instance, determining history from the sentence by checking for presence of date markers such as (year, month, day, hour, fortnight, etc) in the sentence clauses. From the same clauses, a check is performed for specific markers that indicate a date in the past (such as 'from', 'since', 'at', etc. compare with 'since 8 years'). If this fails, a check is made for presence of words such as 'ago', 'history', 'before', 'neonatal', etc.

In the exemplary scenario for Life science, a sentence level function may be configured to check for any number of doctor names/abbreviations in each sentence such as 'Nancy Brown MD'. For doctor names appearing in sentence clauses, the function may then check for names that refer to a doctor of a particular kind. For instance, 'Nance Brown→is→cardiologist'. The function may also check for synonyms of doctors such as physician, cardiologist, etc. in the given sentence. The function may then look for a shortest path between such synonym occurrences and potential doctor names. If the dependency path has words such as 'is', 'was', etc. the names may be considered as doctor names.

In the exemplary scenario for Life science, a sentence level function may be configured to find any number of hospice/care facilities from each sentence. In an embodiment, SpaCy™ annotation may be used to detect ORG (organization) and then check within organization entities if words such as hospital, clinic, care center, etc. are present. If present, then each such entity may be tagged as a hospital.

In the exemplary scenario for Life science, a sentence level function may be configured to determine patient age using say a maxEnt classifier that looks for mention of time (years, months, days, hours, etc.) and a combination of words surrounding it. In an embodiment, the classifier may learn based on manually annotated set of data.

In the exemplary scenario for Life science, a sentence level function may be configured to identify patient gender. A set of context actions from sentence clauses that always point to a patient are first learnt. Then it is determined whether the person being talked about is a patient. If yes, then gender maybe detected from parts of the narrative. Example context are provided in Table 1 herein below.

TABLE 1 admitted with
suffering from
discharged
. . .

In the exemplary scenario for Life science, a sentence level function may be configured to determine outcome of a case using a rule based extraction logic. Outcome may be one of: fatal, recovered, not recovered, recovered with sequelae, improved, or unknown. The logic looks for certain keywords either in the sentence or within sentence clauses to determine outcome on a sentence level.

In the exemplary scenario for Life science, a sentence level function may be configured to detect drugs, indications and reactions. Detection of drug names and symptoms (indications and reactions) are performed on a per sentence basis. Drug names are invariably assumed to be part of noun chunks. However, it may be noted that along with noun chunks, symptom mentions such as 'itching' and 'vomiting' may be in gerund forms as well. In an embodiment, the drug/symptom detection mechanism may be enumerated as follows:

Identify noun-chunks in a sentence
Perform context dictionary match against the sentence and identify the noun-chunks related to the context dictionary match.
Intelligently check whether the context dictionary match actually points to a drug/symptom mention or not.

For a sentence: 'Patient was given Ibuprofen to treat pain and he reported paresthesia.', the noun chunks extracted may be: ('Patient', 'Ibuprofen', 'pain', 'he', 'paresthesia') Tags after dictionary match: ('', 'DRUG', 'SYMP','', 'SYMP').

Along with the tags, for each noun chunk, following variables may also be stored:

ParaTags—named dictionary entities (as returned from dictionary)
ParaDictItems—other parameters from the dictionary. This data may be used to populate various E2B parameters.
ncStEn—noun chunks's start and end position relative to the sentence (used for internal processing).

For a sentence: 'A 55-year-old HIV-negative Caucasian Italian woman with fever and low back pain lasting one month was admitted to our Emergency Surgical Department in April-2015.'

The noun-chunks extracted may be: ('A 55-year-old HIV-negative Caucasian Italian woman', 'fever', 'back pain', 'our Emergency Surgical Department', 'April-2015', 'one month')

Drug dictionary match considers 'April' as a drug (April-brand name, Imidapril-generic name). The intelligence embedded in the system 100 re-checks and detects that based on the context of the sentence, April is NOT a drug.

In the exemplary scenario for Life science, a sentence level function may be configured to identify drugs. It is assumed that drug names will always be part of noun-phrases in a given sentence. 'lookup.py' is called with the whole sentence as argument to detect drug names. Once detected, the following variables may be stored: paraTags, paraDictItems and ncStEn.

Consider the sentence 'Patient was given intravenous Imidapril on April-2015' The sentence clauses created out this sentence are given below. From drug dictionary match, both April and Imidapril are considered as potential drugs.

Patient ! given on ! April-2015
Patient ! given ! intravenous Imidapril

Once sentence clauses are derived, feature sets are created out of each sentence clause by way of tagging words: subj-patient, act-given on, obj-April, obj-2015 (for first clause). These features are then checked against a rule book. Consider the rules in table 2 given below.

TABLE 2

Drug Named Entity Recognition (NER) rule examples obj-route, obj-drug
subj-person, act-given, obj-drug
. . .

The second clause (Imidapril) matches at least one rule (in this case, both the rules) and therefore this is considered as a drug. The first clause (April) does not match any rule and is therefore identified as 'Not a Drug'. For entities that do not pass the rule book test, a max-Entropy classifier is employed. The maximum Entropy classifier is learned on a large number of training examples and is therefore capable of supporting larger variation in data.

In the exemplary scenario for Life science, a sentence level function may be configured to identify reactions and indications. A context dictionary match is performed to identify symptoms. A set of rules may be employed to check if a symptom is an indication or a reaction (using sentence clauses as well as words before and after the symptom). For situations, where a symptom cannot be adjudged as a reaction or an indication, a maximum Entropy classifier may be employed.

In the exemplary scenario for Life science, a sentence level function may be configured to identify reactions from gerunds. Certain reactions occur in the form of gerunds ('itching', 'vomiting'). Dictionary based extraction is used detect them. However, because of their part of speech form, reasonable sentence clauses cannot be used to identify if they are indications or reactions. These are invariably considered as reactions. It is noted that a single dictionary match call is used to determine all reactions (whether gerunds or not).

In the exemplary scenario for Life science, a sentence level function may be configured for date processing. Date processing logic is used to identify and extract all kinds of dates. An exemplary list of dates extracted may be as given below. The logic is deterministic and looks for keywords in sentence clauses.

Patient date of birth

Patient date of death

Patient hospitalization date

Drug Start and Stop Date

Reaction Start and Stop Date

In the exemplary scenario for Life science, a sentence level function may be configured to extract drug signatures. Drug signatures such as route of administration, dosage, duration are extracted using this function. The task of signature extraction is broken into 2 parts:

Deterministic identification of signature

Rule based mapping of signature to drug (for situations where more than 1 drug is mentioned in a sentence)

For the mapping task, following features may be used:

Distance of signature from drug mention.

Presence of conjunctions and punctuations between drug and signature.

Presence of another drug mention between a signature and drug.

In accordance with an embodiment of the present disclosure, the context dictionary is pre-created based on one or more training documents. Sentences contained in the one or more training documents are annotated and entities in the sentences are identified, wherein an entity in the sentence may be a drug name in a Life science scenario. Sentence clauses are then extracted from the annotated sentences and sentence clauses having the identified entities are selected. In the Life science scenario, the sentence clauses that have any reference to the drug name only will be considered. Context association of the identified entities with verb spans in the sentence clauses is analyzed, wherein for each sentence clause, the words are split into subject, action and object to create market-basket items. For example, for a sentence clause 'Patient with pain: treated with: Ibuprofen', entities are created as: sub-patient, subj-with, subj-*symp*, act-treated with, obj-*drug* (the action part is not split). The resultant data is shown in Table 3 herein below. The market basket transactions have 2 components: (i) transaction id, (ii) entity. Transaction id is (arbitrarily) assigned an integer starting from 0 and is kept consistent across entities for a single sentence clause. In other words, if a sentence has 5 sentence clauses, there may be 5 transaction ids.

TABLE 3

Market Basket entities

| | |
|---|---|
| 0 | subj-patient |
| 0 | subj-with |
| 0 | subj-*symp* |
| 0 | act-treated with |
| 0 | obj-*drug* |

The market basket entities are fed to a context mining algorithm for checking frequently occurring associations (variant of apriori algorithm) and the output is a set of rules along with values of support and confidence as shown in Table 4 herein below.

TABLE 4

Examples of Output Rules

| Antecedent | Consequent | Support | Confidence |
|---|---|---|---|
| subj-*drug* | subj-*therapy* | 1101 | 0.8401453224 |
| subj-*drug* | subj-after | 216 | 0.8148148148 |
| subj-*drug* | subj-high-dose | 81 | 0.975308642 |

An appropriate context association may be selected for inclusion in the context dictionary based on the frequency of associations.

In an embodiment, the step of extracting data from the image form of the one or more source documents comprises: cleaning the image, detecting tiles in the image followed by detecting text blobs therein and placing the tiles and text according to their positions. Cleaning of the image may involve pre-processing steps including pre-processing the input image to enhance quality of the input image by performing one or more of: converting the input image to grayscale; introducing blurriness, pixel density adjustment and histogram equalization. Detecting tiles in the image is generally required for forms/reports. Identification of tiles helps in identifying which text is part of the tile and which is free text. This is required to place the extracted text in such a way that content of tiles is not merged into one another and also it help in identifying whether there is any table present in the image. Detecting tiles involves identifying line segments in the image; eliminating lines having a length less than a cutoff value, reproducing the remaining lines on a new white image which is used for further pre-processing and deducing contours that is then converted to rectangles that represent tiles in the image. Text blobs in the image are continuous text present therein. A text blob may be a paragraph or just a word. For detecting text blobs, the pre-processing steps are performed on the image, binary threshold is applied on the image to convert it into a binary image that is further dilated by using a wide kernel, contours identifying closed objects in the image are identified along with their positions in the image. Each rectangle may be cropped and passed to OCR for character recognition. The position of the rectangle is used as reference for the position of the text in the image. For placing the tiles and text according to their position, the text is added to a corresponding tile as tile text or treated as free text and a new tile is created across the free text. Tiles that are present in the same horizontal line are identified and the associated text boxes are grouped. The groups are sorted from top to bottom and then the text may be placed tile by tile. The final output may be an XML file with positions of text and tiles or may be a text file with text arranged in a proper order.

In accordance with an embodiment of the present disclosure, the one or more processors 104 are configured to evaluate, at step 208, the Enterprise-to Business (E2B) XML form for accuracy and completion of the step of extracting data. In an embodiment this step maybe implemented as part of the L3 level or the evaluation layer. The step 208 of evaluating the E2B XML comprises correlating the set of templates obtained from the Enterprise-to Business (E2B) XML form to check similarity across the one or more source documents. A confidence score pertaining to extraction of entities and attributes of each of the Enterprise-to Business (E2B) XML form is computed followed by an overall confidence score for each of the Enterprise-to Business (E2B) XML form.

In accordance with an embodiment of the present disclosure, the step of computing a confidence score of extraction of entities and attributes is based on one or more of: the form (structured/unstructured) of the one or more source document; the method of validating the one or more entities based on a context dictionary match or a probabilistic approach; and accuracy of the context dictionary match. For instance, in the Life science scenario, a fuzzy match may have been employed in identifying and coding entities such as Adverse Event, Drug indication etc. to appropriate MedDRA™ codes. The confidence score may then depend on the degree of match with the MedDRA™ term.

In accordance with an embodiment of the present disclosure, the step of computing the overall confidence score is based on the confidence score of each of the extraction of entities and attributes and associated pre-defined weightages. The weightages may be pre-defined based on criticality, reportability, etc. An exemplary representation of the computing of the overall confidence score for the Life science scenario may be represented as below.

i. Patient Name
   a. Confidence Score: $C_{pn}$
   b. Weightage: $W_{pn}$
ii. Drug Name
   a. Confidence Score: $C_{dn}$
   b. Weightage: $W_{dn}$
iii. . . . so on $$\text{Overall Score: } \frac{1}{2}(C_{pn} \times W_{pn}) + (C_{dn} \times W_{dn}) + \ldots (C_i \times W_i)$$

Thus, Overall score=$1/m \Sigma(W_i \times C_i)$ where i=0 to i=m and i represents number of attributes In the exemplary Life science scenario, L3 level implementation involves supervised learning with sufficient datasets to build a hypothesis. Typical hypothesis are built around Unlisted Events for Drugs, relation between Event and Medical History and Causality assessment. The learnings based on the implementation may be fed back for updating the various ontologies and rules described herein.

In accordance with an embodiment of the present disclosure, the one or more processors 104 are configured to evaluate, at step 210, validity of the one or more source documents may be decided based on existence of content in the pre-defined set of templates. In an embodiment this step maybe implemented as part of the L4 level or the decision layer. Sometimes, the quality of information available in the one or more source documents may be poor. There may be very few cases (say <10%) which have all the pre-defined set of templates properly filled in with content based on the extracted data. In such cases, supervised learning fails to give consistent and relatively better accuracy. In such scenarios, semi-supervised or unsupervised learnings play a major role in devising hypothesis. Probabilistic Deep Learning methods are proven better over shallow learning. For building Unlisted Events and Drugs Correlation, Causality Classifiers etc., Neural Networks maybe employed and trained over a period. The L4 level is primarily aimed at using Deep Learning to find unknown or abstract patterns from the extracted data, although the extracted data may be incomplete or insufficient.

In accordance with the present disclosure, once the validity of the one or more source documents is established in step 210, the one or more source documents may be classified further based on the content in the pre-defined set of templates using neural networks. In the exemplary Life science scenario, the classification may be serious/non-serious. In the Banking scenario, the classification may be fraudulent/non-fraudulent. Likewise, in the communication surveillance scenario, the classification may be authorized/unauthorized. In an embodiment, the confidence score may also be calculated based on the classifications explained herein above.

In accordance with the present disclosure, decisions may be traced at each level of the system. In an embodiment, decision traceability pertains to at least the steps of by validating the one or more entities based on a context dictionary match or a probabilistic approach; correlating the set of templates obtained from the Enterprise-to Business (E2B) XML form; deciding on validity of the one or more source documents; and classifying the validated one or more source documents. In an embodiment, decision traceability may be achieved by contextual logging of each step of the method of the present disclosure. For instance, extracting sentences, its tokenization process and entity matching may be logged. Furthermore, input and output of each of the steps may be captured and the transformation of information may be linked. Each log captures the decision taken along with the rules that were used for the decision taken. For instance, FIG. 10 is an exemplary illustration of decision traceability in accordance with an embodiment of the present disclosure.

In accordance with the present disclosure, systems and methods of the present disclosure facilitate.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method comprising:
   extracting metadata associated with one or more source documents, wherein the one or more source documents are identified as having a structured form, a semi-structured form, an unstructured form, an image form or a combination thereof, based on the extracted metadata;
   processing the one or more source documents to extract data comprising entities and attributes thereof;
   extracting data from the one or more source documents in either native language or English language based on cognitive processing of the one or more source documents to obtain an Enterprise-to Business (E2B) Extensible Markup Language (XML) form having a pre-defined set of templates (206);
   evaluating the Enterprise-to Business (E2B) XML form for accuracy and completion of the step of extracting data, wherein the evaluating comprises:
      correlating the set of templates obtained from the Enterprise-to Business (E2B) XML form to check similarity across the one or more source documents,
      computing a confidence score of extraction of entities and attributes in each of the Enterprise-to Business (E2B) XML form, and
      computing an overall confidence score for each of the Enterprise-to Business (E2B) XML form based on the confidence score of each of the extraction of entities and attributes and pre-defined weightages thereof;
   deciding validity of the one or more source documents based on existence of content in the pre-defined set of templates; and
   classifying the validated one or more source documents based on analyses of the content in the pre-defined set of templates using neural networks.

2. The processor implemented method of claim 1, wherein the extracting comprises using at least one of a deterministic approach and a probabilistic approach.

3. The processor implemented method of claim 1, wherein the structured form and the unstructured form of the one or more source documents are processed by:
   converting the one or more source documents to a formatted Extensible Markup Language (XML) form, wherein the formatted XML form includes in a raw form of one or more of (i) page wise information pertaining to coordinates, font style, font type of text contained therein at a character level and (ii) information pertaining to one or more of cells, border lines associated with the cells and images contained therein; and
   converting the formatted XML form to an intermediate XML form having a format conforming to a format of the corresponding one or more source documents.

4. The processor implemented method of claim 3, wherein extracting data from the structured form of the one or more source documents comprises:
   identifying sections comprised in the intermediate XML form as parent nodes and extracting data contained in each of the sections based on a first set of pre-defined rules pertaining to the identified sections, wherein the sections include horizontal or vertical tables, forms, key-value pairs and plain text;
   storing the extracted data pertaining to each of the sections in an extracted XML form wherein entities and attributes thereof in each of the sections represents a child node having a value associated thereof;
   performing a context dictionary match for the entities and the attributes to obtain matched entities and attributes; and
   populating the Enterprise-to Business (E2B) XML form based on at least a part of the matched entities and attributes.

5. The processor implemented method of claim 4, wherein extracting data from the unstructured form of the one or more source documents comprises:
   creating a master map of elements comprised in each page of the intermediate XML form, wherein the elements include page numbers and groups based on the attributes;
   determining a physical layout of each page based on the created master map;

identifying the one or more source documents having the unstructured form based on a type associated thereof;

creating an extracted XML form having a page by page flow based on the physical layout;

segmenting the extracted XML into sentences and further extracting a set of sentence clauses from the sentences by:

eliminating word joins and symbols in the sentences;

annotating the sentences using a dependency parser;

extracting the set of sentence clauses from the annotated sentences based on noun chunks, verb spans and dependencies between words in the sentences and a second set of pre-defined rules, wherein the dependencies are stored as a dependency tree in the form of a graph;

parsing subject clauses and object clauses from the set of sentence clauses for the context dictionary match to obtain one or more entities;

validating the obtained one or more entities based on either the context dictionary match or a probabilistic approach;

extracting one or more validated entities along with attributes thereof as the extracted data; and populating the Enterprise-to Business (E2B) XML form based on at least a part of the extracted data.

6. The processor implemented method of claim 5, wherein extracting the set of sentence clauses is preceded by Parts of Speech (POS) tagging.

7. The processor implemented method of claim 5, wherein the context dictionary match comprises performing at least one of:

checking for an exact match by: comparing one or more words in the set of sentence clauses for the context dictionary match, wherein the context dictionary is pre-defined; identifying an exact match for a single word; checking for a partial match and processing a new match for multiple words; and checking for a fuzzy match by: performing a similarity match between the sentences;

computing edit distance between two sentences and an associated similarity score; generating a fuzzy match output by either extracting values based on the computed similarity score, based on a pre-defined number of best matches, or based on a best match.

8. The processor implemented method of claim 5, wherein the context dictionary is created by:

receiving one or more training documents;

annotating sentences contained in the one or more training documents and identifying entities therein;

extracting sentence clauses from the annotated sentences and identifying sentence clauses having the identified entities;

analyzing context association of the identified entities with verb spans in the sentence clauses;

computing frequency of the context association based on a context mining method; and selecting the context association to be included in the context dictionary based on the computed frequency thereof.

9. The processor implemented method of claim 1, wherein computing a confidence score of extraction of entities and attributes is based on one or more of: the form of the one or more source documents; the method of validating the one or more entities based on a context dictionary match or a probabilistic approach; and accuracy of the context dictionary match.

10. The processor implemented method of claim 1, further comprising performing decision traceability pertaining to at least:

validating the one or more entities based on a context dictionary match or a probabilistic approach;

correlating the set of templates obtained from the Enterprise-to Business (E2B) XML form;

deciding on validity of the one or more source documents; and classifying the validated one or more source documents, by contextual logging of the steps, capturing input and output of each of the steps and linking transformation of information at each of the steps.

11. A system comprising:

one or more data storage devices operatively coupled to one or more hardware processors and configured to store instructions configured for execution by the one or more hardware processors to:

extract metadata associated with one or more source documents, wherein the one or more source documents are identified as having a structured form, a semi-structured form, an unstructured form, an image form or a combination thereof, based on the extracted metadata;

process the one or more source documents to extract data comprising entities and attributes thereof;

extract data from the one or more source documents in either native language or English language based on cognitive processing of the one or more source documents to obtain an Enterprise-to Business (E2B) Extensible Markup Language (XML) form having a pre-defined set of templates;

evaluate the Enterprise-to Business (E2B) XML form for accuracy and completion of the step of extracting data, wherein the evaluating comprises:

correlating the set of templates obtained from the Enterprise-to Business (E2B) XML form to check similarity across the one or more source documents, computing a confidence score of extraction of entities and attributes in each of the Enterprise-to Business (E2B) XML form, and computing an overall confidence score for each of the Enterprise-to Business (E2B) XML form based on the confidence score of each of the extraction of entities and attributes and pre-defined weightages thereof;

decide validity of the one or more source documents based on existence of content in the pre-defined set of templates; and classify the validated one or more source documents based on analyses of the content in the pre-defined set of templates using neural networks.

12. The system of claim 11, wherein the one or more hardware processors are further configured to process the structured form and the unstructured form of the one or more source documents by:

converting the one or more source documents to a formatted Extensible Markup Language (XML) form, wherein the formatted XML form includes in a raw form of one or more of (i) page wise information pertaining to coordinates, font style, font type of text contained therein at a character level and (ii) information pertaining to one or more of cells, border lines associated with the cells and images contained therein; and converting the formatted XML, form to an intermediate XML, form having a format conforming to a format of the corresponding one or more source documents.

13. The system of claim 12, wherein the one or more hardware processors are further configured to extract data from the structured form of the one or more source documents by:
identifying sections comprised in the intermediate XML form as parent nodes and extracting data contained in each of the sections based on a first set of pre-defined rules pertaining to the identified sections, wherein the sections include horizontal or vertical tables, forms, key-value pairs and plain text;
storing the extracted data pertaining to each of the sections in an extracted XML form wherein entities and attributes thereof in each of the sections represents a child node having a value associated thereof;
performing a context dictionary match for the entities and the attributes to obtain matched entities and attributes; and
populating the Enterprise-to Business (E2B) XML form based on at least a part of the matched entities and attributes.

14. The system of claim 13, wherein the one or more hardware processors are further configured to extract data from the unstructured form of the one or more source documents by:
creating a master map of elements comprised in each page of the intermediate XML form, wherein the elements include page numbers and groups based on the attributes;
determining a physical layout of each page based on the created master map;
identifying the one or more source documents having the unstructured form based on a type associated thereof;
creating an extracted XML form having a page by page flow based on the physical layout;
segmenting the extracted XML into sentences and further extracting a set of sentence clauses from the sentences by: eliminating word joins and symbols in the sentences;
annotating the sentences using a dependency parser; extracting the set of sentence clauses from the annotated sentences based on noun chunks, verb spans and dependencies between words in the sentences and a second set of pre-defined rules, wherein the dependencies are stored as a dependency tree in the form of a graph;
parsing subject clauses and object clauses from the set of sentence clauses for the context dictionary match to obtain one or more entities;
validating the obtained one or more entities based on either the context dictionary match or a probabilistic approach;
extracting one or more validated entities along with attributes thereof as the extracted data; and
populating the Enterprise-to Business (E2B) XML form based on at least a part of the extracted data.

15. The system of claim 14, wherein the one or more hardware processors are further configured to perform:
the context dictionary match by performing at least one of:
checking for an exact match by:
comparing one or more words in the set of sentence clauses for the context dictionary match, wherein the context dictionary is pre-defined;
identifying an exact match for a single word;
checking for a partial match and processing a new match for multiple words; and
checking for a fuzzy match by: performing a similarity match between the sentences;
computing edit distance between two sentences and an associated similarity score;
generating a fuzzy match output by either extracting values based on the computed similarity score, based on a pre-defined number of best matches, or based on a best match; and
create a context dictionary by:
receiving one or more training documents;
annotating sentences contained in the one or more training documents and identifying entities therein;
extracting sentence clauses from the annotated sentences and identifying sentence clauses having the identified entities;
analyzing context association of the identified entities with verb spans in the sentence clauses;
computing frequency of the context association based on a context mining method; and
selecting the context association to be included in the context dictionary based on the computed frequency thereof.

16. The system of claim 11, wherein the one or more hardware processors are further configured to trace decisions pertaining to at least the steps of:
validating the one or more entities based on a context dictionary match or a probabilistic approach;
correlating the set of templates obtained from the Enterprise-to Business (E2B) XML form;
deciding on validity of the one or more source documents; and
classifying the validated one or more source documents, by contextual logging of the steps, capturing input and output of each of the steps and linking transformation of information at each of the steps.

17. The system of claim 11, wherein the one or more hardware processors are further configured to compute a confidence score of extraction of entities and attributes is based on one or more of: the form of the one or more source documents; the method of validating the one or more entities based on a context dictionary match or a probabilistic approach; and accuracy of the context dictionary match.

18. A non-transitory computer readable medium having a computer readable program embodied therein, wherein the computer readable program, when executed on a computing device, causes the computing device to:
extract metadata associated with one or more source documents, wherein the one or more source documents are identified as having a structured form, a semi-structured form, an unstructured form, an image form or a combination thereof, based on the extracted metadata;
process the one or more source documents to extract data comprising entities and attributes thereof;
extract data from the one or more source documents in either native language or English language based on cognitive processing of the one or more source documents to obtain an Enterprise-to Business (E2B) Extensible Markup Language (XML) form having a pre-defined set of templates;
evaluate the Enterprise-to Business (E2B) XML form for accuracy and completion of the step of extracting data, wherein the evaluating comprises:

correlating the set of templates obtained from the Enterprise-to Business (E2B) XML form to check similarity across the one or more source documents;
computing a confidence score of extraction of entities and attributes in each of the Enterprise-to Business (E2B) XML form based on one or more of:
   form of the one or more source document;
   method of validating the one or more entities based on a context dictionary match or a probabilistic approach; and
   accuracy of the context dictionary match; and
computing an overall confidence score for each of the Enterprise-to Business (E2B) XML form based on the confidence score of each of the extraction of entities and attributes and pre-defined weightages thereof;
decide validity of the one or more source documents based on existence of content in the pre-defined set of templates; and
classify the validated one or more source documents based on analyses of the content in the pre-defined set of templates using neural networks.

\* \* \* \* \*